(12) United States Patent
Choo et al.

(10) Patent No.: US 7,000,067 B2
(45) Date of Patent: Feb. 14, 2006

(54) VIRTUAL EXPANSION OF PROGRAM RAM SIZE

(75) Inventors: Swee Kieong Choo, Singapore (SG); HuaYuan Chen, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 421 days.

(21) Appl. No.: 10/334,400

(22) Filed: Dec. 30, 2002

(65) Prior Publication Data

US 2003/0229756 A1    Dec. 11, 2003

Related U.S. Application Data

(60) Provisional application No. 60/387,008, filed on Jun. 7, 2002.

(51) Int. Cl.
*G06F 12/00*    (2006.01)

(52) U.S. Cl. .............................. 711/112; 711/2; 711/4; 711/6; 711/119; 711/133; 711/159; 711/165; 711/203

(58) Field of Classification Search ................ 711/2, 711/4, 6, 112, 119, 133, 159, 165, 203

See application file for complete search history.

(56) References Cited

U.S. PATENT DOCUMENTS

| | | | | |
|---|---|---|---|---|
| 5,603,063 A | * | 2/1997 | Au | ................................ 710/52 |
| 5,778,430 A | * | 7/1998 | Ish et al. | ..................... 711/133 |
| 5,983,023 A | * | 11/1999 | Moriwaki et al. | ............ 712/32 |
| 6,446,199 B1 | | 9/2002 | Howe et al. | |
| 6,470,461 B1 | * | 10/2002 | Pinvidic et al. | ................. 714/8 |
| 6,516,397 B2 | | 2/2003 | Roy et al. | |
| 6,775,744 B2 | * | 8/2004 | Yagi et al. | ................... 711/119 |
| 6,845,434 B2 | * | 1/2005 | Lin | ............................ 711/162 |
| 2002/0154337 A1 | * | 10/2002 | Sakata | ........................ 358/1.16 |

* cited by examiner

*Primary Examiner*—Donald Sparks
*Assistant Examiner*—Bao Q. Truong
(74) *Attorney, Agent, or Firm*—Shumaker & Sieffert, P. A.

(57) ABSTRACT

A method and apparatus for virtually expanding the rapid-access memory space of a device employing time-critical software modules and having various modes of operation. Each of the modes of operation of the device is identified. For each mode of operation, the time-critical software modules used during the mode are identified. The software modules used during all modes of operation are permanently stored in rapid-access memory. However, a software module that is used only during a particular mode of operation is loaded into the rapid-access memory unit only upon entry into the mode of operation in which it is used. The software module is loaded into a region of memory occupied by another software module not utilized during the particular mode of operation being entered.

21 Claims, 7 Drawing Sheets

US 7,000,067 B2

VIRTUAL EXPANSION OF PROGRAM RAM SIZE

RELATED APPLICATIONS

This application claims priority of U.S. provisional application Ser. No. 60/387,008, filed Jun. 7, 2002 and entitled "VIRTUALLY INCREASING OF PROGRAM RAM SIZE."

FIELD OF THE INVENTION

This application relates generally to an apparatus and method for virtually expanding the program RAM size of a device executing time-critical commands, and more particularly to a disc drive that virtually expands its program RAM size.

BACKGROUND OF THE INVENTION

A disc drive is controlled by an embedded microprocessor that executes software instructions stored on more than one memory device. (Herein, software and firmware are referred to jointly as "software.") Typically, the software is divided into modules dedicated to performing certain sorts of operations. For example, a software module may contain various functions, all of which are dedicated to driving the servo system of the disc drive. By virtue of the role to which each software module is dedicated, each such module has a different requirement with respect to execution speed. Certain software modules need to be executed rapidly, because they relate to time-critical functions. Other software modules do not need to be executed as quickly.

One manner of ensuring that time-critical software modules are executed quickly is to store each such module in a rapid-access memory unit. If this can be done, then the microprocessor is able to retrieve the software instructions quickly, and is able to execute them promptly. Thus, per such a scheme, time-critical software modules are stored in a rapid-access memory unit, while non-time-critical software modules are stored in a less expensive slow-access memory unit.

As drive technology has advanced, there has been a corresponding increase in the number of commands a disc drive is required to execute. Therefore, the size of the various time-critical software modules has expanded. As a consequence of this size expansion, disc drive manufacturers are confronted with a dilemma. It is no longer possible to store all of the time-critical software modules in the rapid-access memory unit. Thus, either the rapid-access memory unit needs to be expanded or one of the time-critical software modules needs to be stored in a slow-access memory unit. Each approach has drawbacks. Increasing the amount of available rapid-access memory is costly and puts the disc drive manufacturer at a competitive disadvantage. On the other hand, storing a time-critical software module in a slow-access memory unit, while inexpensive, is harmful to the performance of the disc drive.

As is evident from the foregoing discussion, there exists a need for a scheme by which a disc drive may virtually expand the size of its rapid-access memory space. A desirable solution will accomplish this end with little or no additional cost to the disc drive manufacturer.

SUMMARY OF THE INVENTION

Against this backdrop the present embodiments have been developed. A method of virtually expanding fast-access memory in a data storage device may be accomplished by performing the following steps. Initially, a command from a host is received. Next, it is determined whether the command requires access to a first software unit. If so, the first software unit from a slow-access memory into an address range in a fast access memory occupied by a second software unit not used during the first mode of operation.

According to another embodiment, a data storage device employing the above-described scheme may include a servo system capable of accelerating and decelerating a transducer located on an actuator arm. The data storage device may also include a rapid-access memory unit, a slow-access memory unit storing a first software unit used during a first mode of operation, and a read-only memory unit. Additionally the data storage device includes a microprocessor for executing software instructions stored upon the rapid-access and slow-access memory units. The microprocessor may be programmed to execute the following steps. Initially it receives a command from a host. Thereafter, it determines whether the command requires access to the first software unit. If so, the first software unit is loaded from a slow-access memory into an address range in a fast access memory occupied by a second software unit not used during the first mode of operation.

According to yet another embodiment, a data storage device may employ the virtual memory expansion scheme. The data storage device may include a microprocessor and a means for loading, from a slow-access memory unit, a first software unit used during a first mode of operation, to an address range of a fast-access memory unit occupied by a second software unit not used during the first mode of operation. The loading operation occurs upon transition from a second mode of operation to the first mode of operation.

These and various other features as well as advantages which characterize the present invention will be apparent from a reading of the following detailed description and a review of the associated drawings.

DETAILED DESCRIPTION

A disc drive may be made to virtually expand its rapid-access memory space (also referred to as "program RAM space") by implementation of the following scheme. Each of the modes of operation of a disc drive is identified. For example, a disc drive may have two modes of operation: a functional mode of operation and a diagnostic mode. For each mode of operation, the time-critical software modules used during the mode are identified. The software modules used during all modes of operation are permanently stored in rapid-access memory. However, a software module that is used only during a particular mode of operation is loaded into the rapid-access memory unit only upon entry into the mode of operation in which it is used. The software module is loaded into a region of memory occupied by a software module not utilized during the particular mode of operation being entered.

Figure 1:
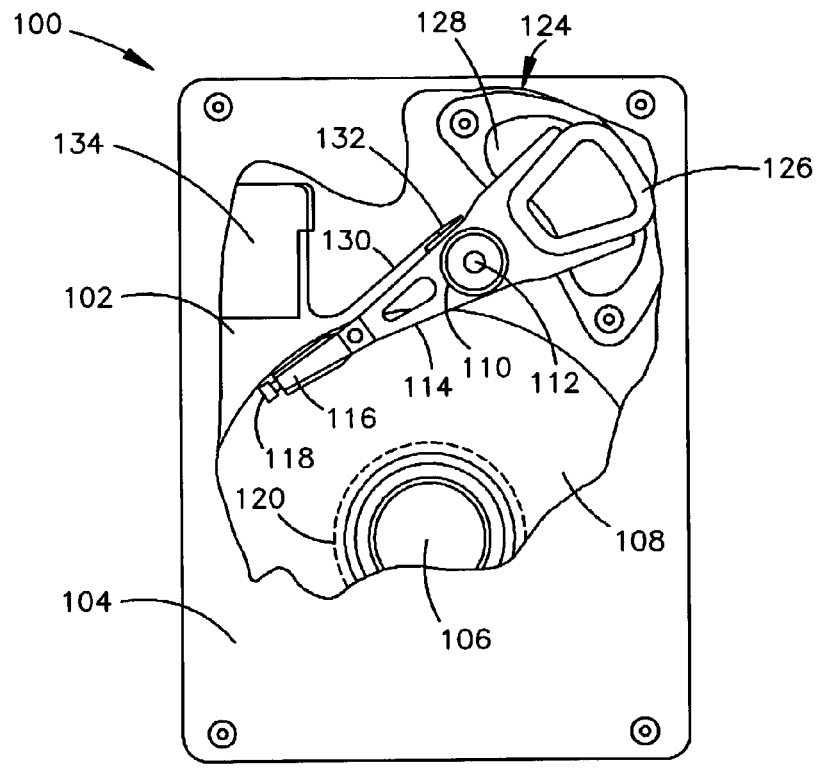
FIG. 1 is a schematic representation of a disc drive in accordance with a preferred embodiment of the invention.
Figure 2:
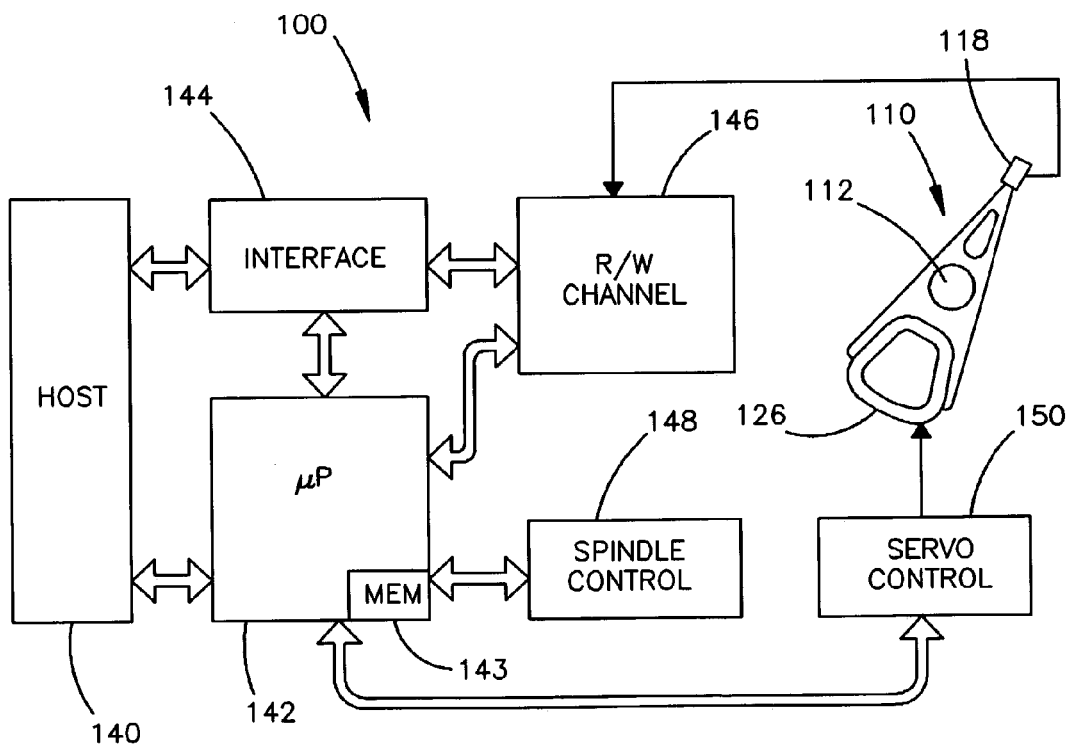
FIG. 2 illustrates a disc drive system connected to a host for the disc drive of FIG. 1

In the disclosure that follows, the discussion related to FIGS. 1 and 2 is intended to familiarize the reader with a disc drive generally. The discussion related to the remaining figures focuses more particularly on the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114.

Mounted at the distal end of each of the flexures 116 is a head 118 which includes an air bearing slider enabling the head 118 to fly in close proximity above the corresponding surface of the associated disc 108. An air current created by the rotation of the disc 108 interacts with the air-bearing surface to provide the lifting force that permits the head 118 to float.

The position of the heads 118 is controlled through the use of a voice coil motor. (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142. This aspect of the disc drive 100 is elaborated upon below.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a channel 146, which encodes and serializes the data and provides the requisite write current signals to the heads 118. To retrieve data that has been previously stored by the disc drive 100, read signals are generated by the heads 118 and provided to the channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3A:
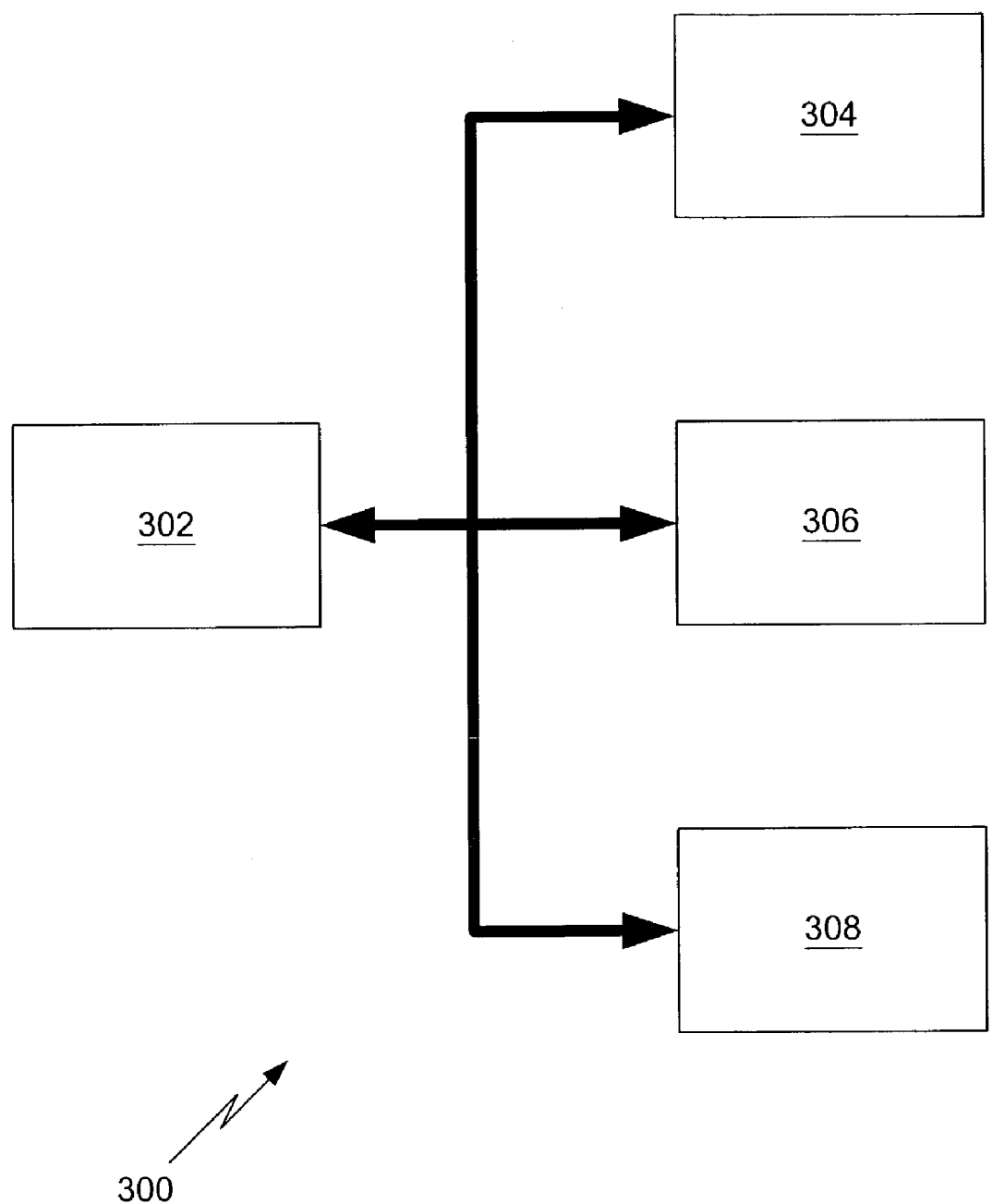
FIG. 3A depicts a computing environment in which the memory expansion scheme may be deployed.

FIG. 3A depicts an exemplary computing environment 300 in which the virtual memory expansion scheme disclosed herein may operate. The computing environment 300 includes a processor 302 that is operably coupled to a rapid-access memory 304 (also referred to herein as a "fast-access memory"), a slow-access memory 306, and a read-only memory 308. A "fast-access memory unit" is defined as a memory unit that has a faster operational speed than a memory unit chosen as the "slow-access memory unit." For example, the slow-access memory unit 306 may be a synchronous dynamic random access memory unit (an SDRAM unit), while the rapid-access memory unit 304 is a static random access memory unit (SRAM). The SRAM 304 has a faster operational speed than the SDRAM 306, and is therefore regarded as the "fast-access memory unit."

The processor 302 is capable of executing software instructions stored in any of the memory units 304, 306, and 308, and is also capable of copying the contents of one memory device 304, 306, or 308 into the data space of another memory device 304, 306, or 308. Typically, the memory size of the slow-access memory device 306 is larger than the memory size of the fast-access device 304. For example, the fast-access memory 304 may have a memory size of approximately 48 kilobytes, while the slow-access memory unit has a memory size of approximately 2 megabytes.

Figure 3B:
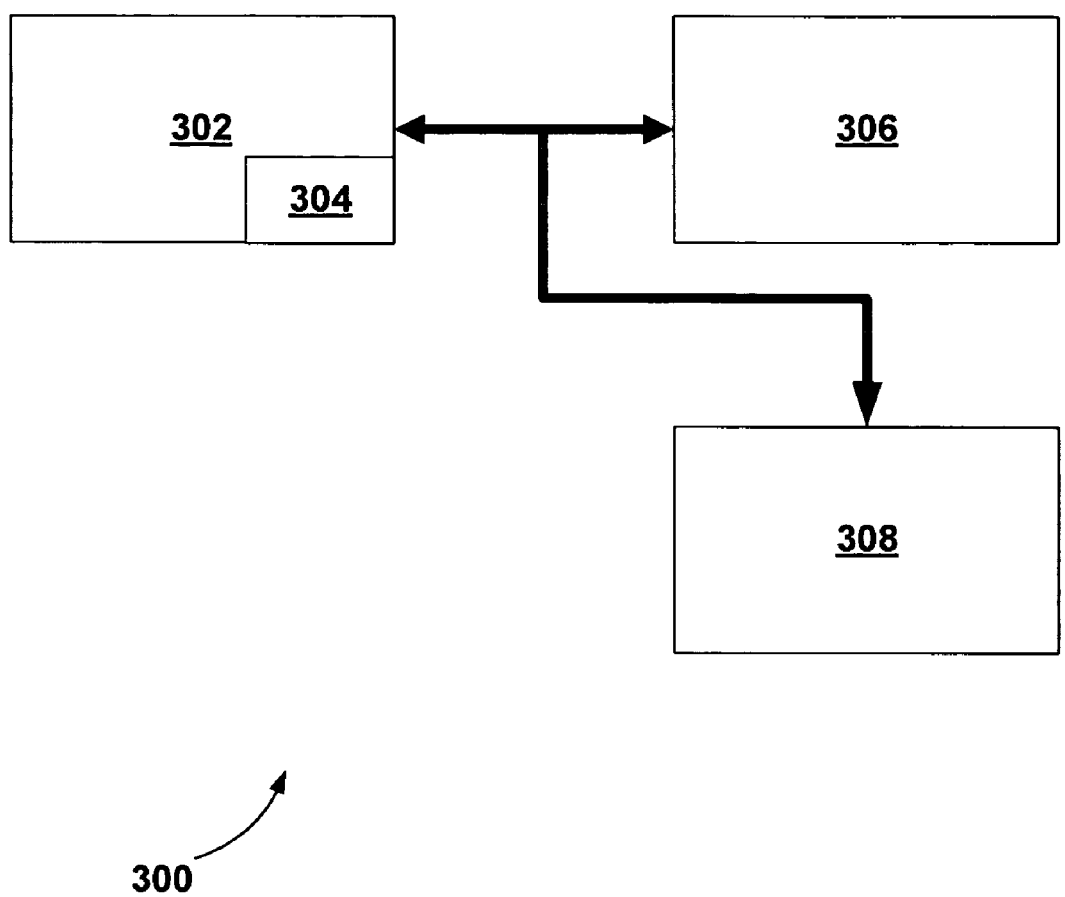
FIG. 3B depicts another computing environment in which the memory expansion scheme may be deployed.

As shown in FIG. 3B, the exemplary computing environment 300 may be altered so that the fast-access memory 304 is on-board the same microchip that the processor 302 is fabricated upon. Such a scheme typically renders the operational speed of the fast-access memory 304 particularly high.

Figure 4:
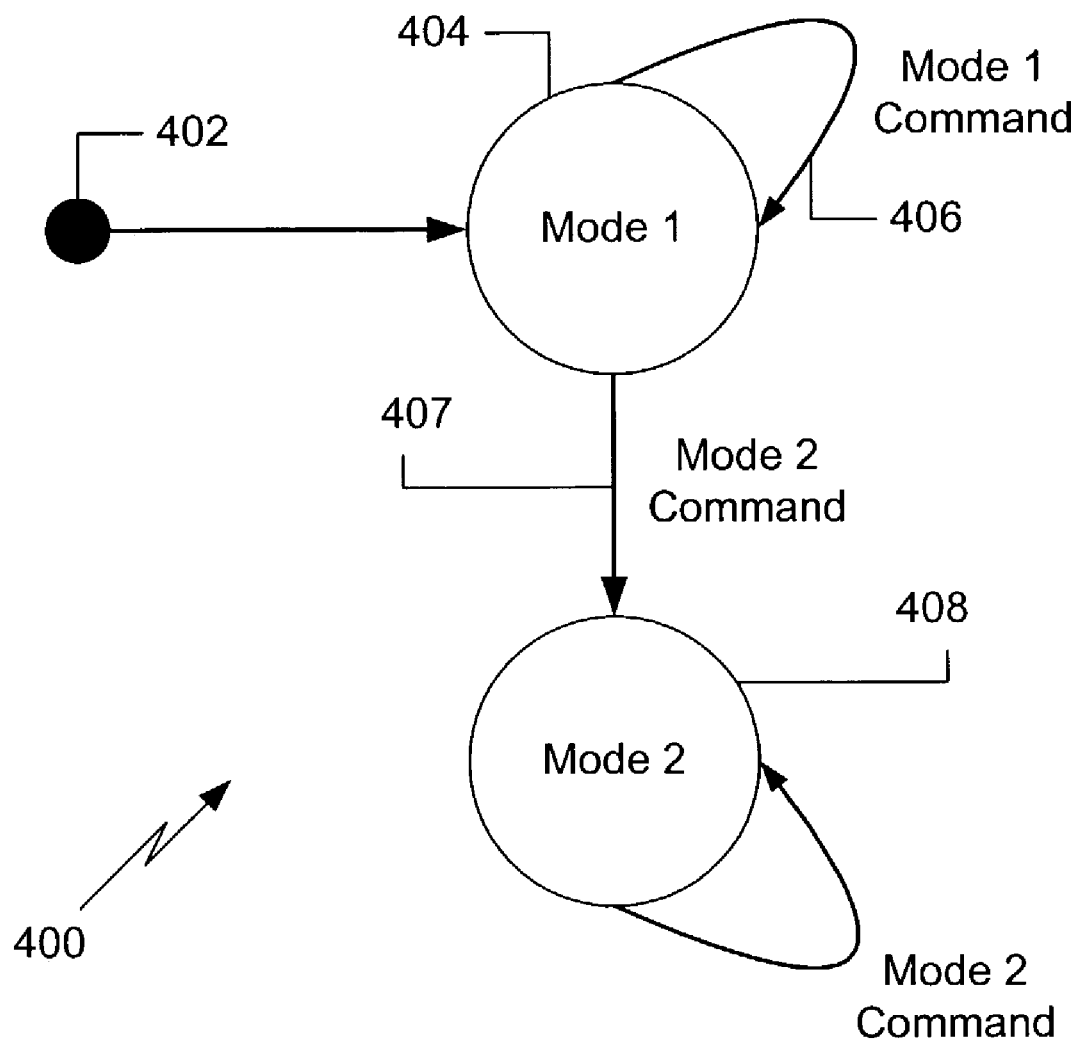
FIG. 4 depicts a mode transition sequence that is amenable to employment of the virtual memory expansion scheme.

FIG. 4 depicts a mode transition diagram describing a mode sequence 400 that is amenable to employment of the virtual memory enlargement scheme disclosed herein. As can be seen from FIG. 4, upon power-up (or upon rebooting of the microprocessor in the disc drive) 402, the disc drive transitions into a first mode of operation 404 (such as a normal operational mode of operation). While in the first mode of operation 404, the disc drive receives commands from the host 140 (depicted in FIG. 2). If a command requires access to a function that is within the function set available in the first mode of operation 404, the disc drive remains in the first mode of operation 404, as shown by mode transition arrow 406. If, on the other hand, a command requires access to a function that is within the function set available in the second mode of operation 408, the disc drive transitions to the second mode of operation 408, as shown by mode transitional arrow 407. An example of a second mode of operation 408 is a diagnostic mode, in which debugging commands or servo-tuning commands may be executed, for example. Once in the second operational mode 408, the disc drive remains in the second operational mode until the disc drive has its power cycled or is rebooted.

In order to employ the virtual memory expansion scheme upon a system having a mode transition sequence 400 as shown in FIG. 4, one needs to determine the time-critical software modules utilized in each mode of operation. Table 1 depicts an exemplary list of time-critical software modules used in mode 1 (operational mode, for example) 404 and mode 2 (diagnostic mode, for example) 408.

TABLE 1

|  | Mode 1 (operational mode) | Mode 2 (diagnostic) |
| --- | --- | --- |
| Servo Module A | X | X |
| Servo Module B |  | X |
| Interface Module A | X |  |
| Interface Module B | X | X |

The software modules listed in Table 1 may provide functionality as generally described below. Servo Module A is a software module dedicated to servo operation that is fundamental to disc drive operation, such as spinning up/down the disc drive, or keeping the head located over its proper track. Servo Module B is a software module that is dedicated to servo functionality needed only during debugging or tuning of servo parameters. Interface Module A is a software module that is dedicated to handling the interface with the host 140 (FIG. 2) with respect to data transfer and data caching. Finally, Interface Module B is a data module that contains low-level read/write functionality.

Figure 5:
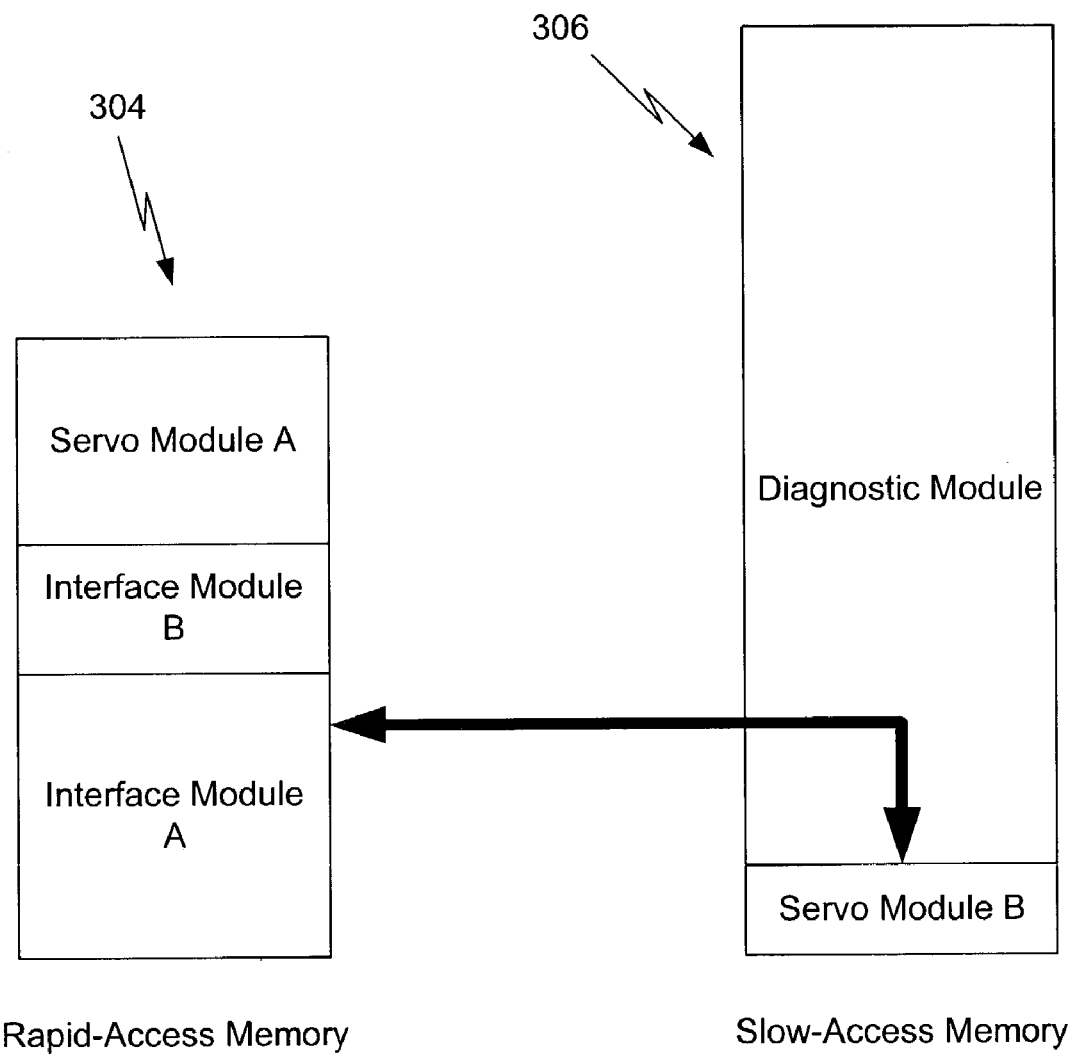
FIG. 5 depicts an exemplary memory map of a device employing the virtual memory expansion scheme.

Looking at Table 1, one will observe that Servo Module A and Interface Module B are used in both operational mode 1 404 and operational mode 2 408. Therefore, they should be permanently stored in the fast-access memory unit 304. On the other hand, Table 1 also reveals that Interface Module A and Servo Module B are each used only in operational modes 1 404 and 2 408, respectively. Because the disc drive initially enters mode 1 404 (as can be seen from FIG. 4), Interface Module A should initially be loaded into the rapid access memory unit 304. Servo Module B is initially stored in slow-access memory 306, perhaps with other software code, such as a Diagnostic Module. The resulting arrangement of data space is depicted in FIG. 5.

Figure 6:
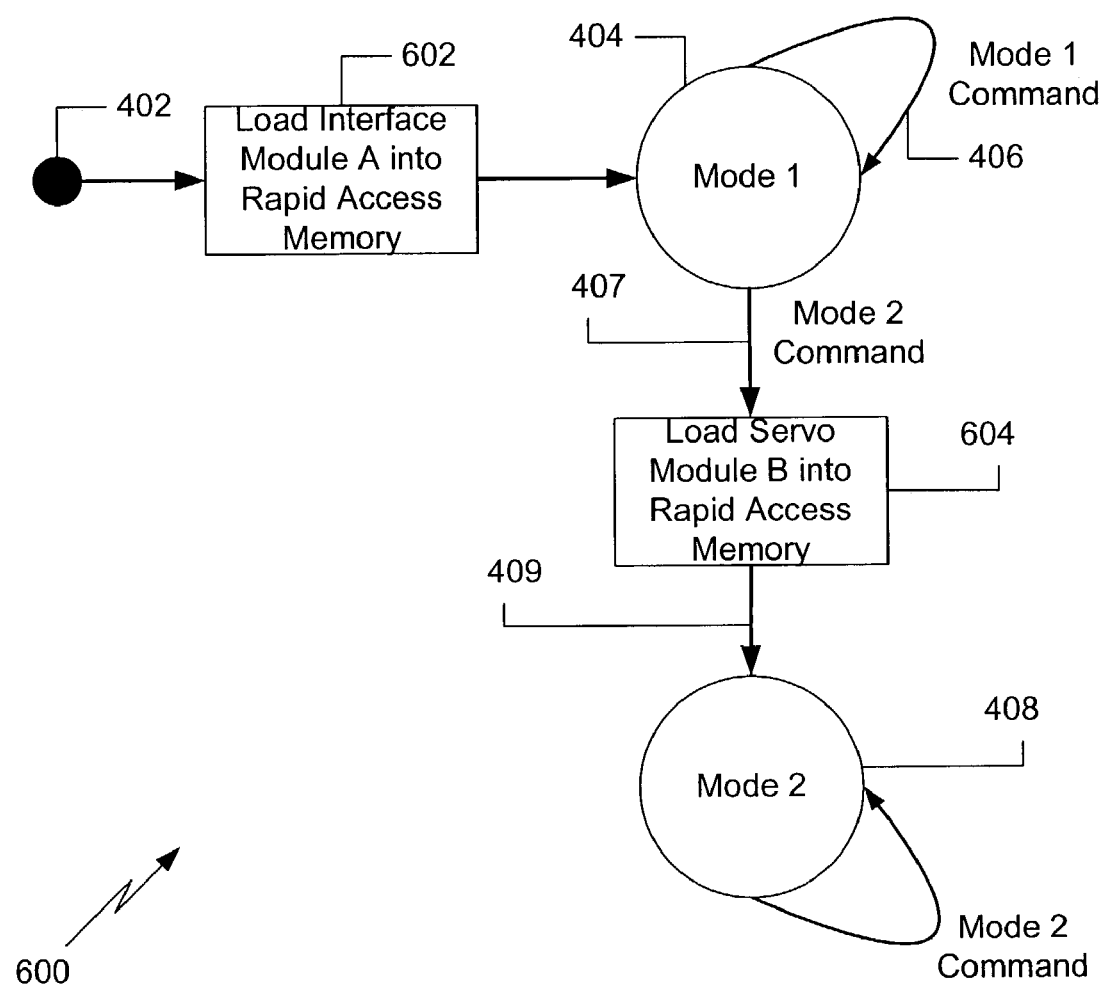
FIG. 6 depicts a mode transition sequence employing the virtual memory expansion scheme.

The data space assigned to Interface Module A is swap space, meaning that when the disc drive transitions into the second mode of operation 408 (by receiving a command requiring access to a function provided by Servo Module B), Servo Module B is written into the space initially assigned to Interface Module A. Thus, per such a scheme, during each mode of disc drive operation, the fast-access memory unit 304 stores the software modules needed for it to perform its required functions. FIG. 6 depicts an operational flow diagram 600 showing the operation of this memory enlargement scheme.

Upon power up or reboot 402, Interface Module A is loaded into the rapid access memory unit 304, as shown in operation 602. Thereafter, the disc drive transitions to a first mode of operation 404. While in the first mode of operation 404, the disc drive receives commands from the host 140 (depicted in FIG. 2). If a command requires access to a function that is within the function set available in the first mode of operation 404, the disc drive remains in the first mode of operation 404, as shown by mode transition arrow 406. If, on the other hand, a command requires access to a function that is within the function set available in the second mode of operation 408, the disc drive transitions to the second mode of operation 408, as shown by mode transitional arrows 407 and 409. During this transition, Servo Module B is loaded into the rapid-access memory unit 304, occupying at least a portion of the address range previously occupied by Interface Module A (which is not used during the second operational mode). The loading of Servo Module B into the rapid-access memory unit is depicted by operation 604.

Figure 7:
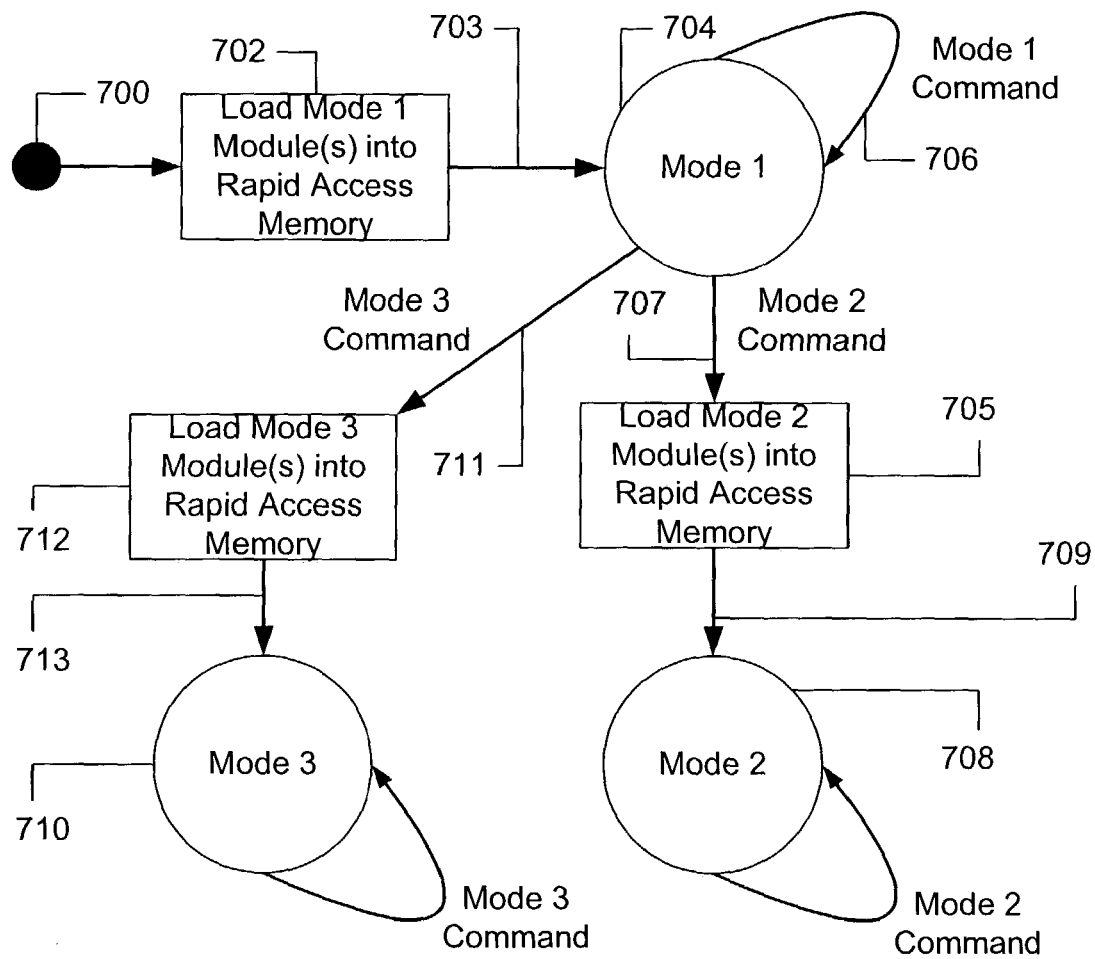
FIG. 7 depicts another mode transition sequence employing the virtual memory expansion scheme.

The general scheme described with reference to FIGS. 4–6 can be expanded to serve a disc drive having any number of operational modes. FIG. 7 depicts the scheme being employed upon a disc drive having three operational modes, for example. As was the case in the two-mode example depicted in FIGS. 4–6, the time critical software modules utilized in each mode of operation are identified. Software modules used in all modes of operation are permanently stored in the rapid access memory 304. Software modules used only during the first mode of operation are assigned swap space in the fast-access memory unit 304. Accordingly, upon power-up or rebooting of the disc drive 700, software modules used only during the first operational mode are loaded into the swap space, as shown in operation 702. Thereafter the disc drive transitions into the first operational mode 704, as shown by mode transition arrow 703.

While in the first mode of operation 704, the disc drive receives commands from the host 140 (depicted in FIG. 2). If a command requires access to a function that is within the function set available in the first mode of operation 704, the disc drive remains in the first mode of operation 704, as shown by mode transition arrow 706. If, on the other hand, a command requires access to a function that is within the function set available in the second or third modes of operation 708 or 710, the disc drive transitions to the appropriate mode of operation 708 or 710, as shown by mode transitional arrows 707 and 709, or 711 and 713. During this transition, the software modules used only during the mode of operation being transitioned into are loaded into the swap space of the rapid-access memory unit 304. The loading of these modules into the rapid-access memory unit is depicted by operations 705 and 712.

To summarize, a disc drive may be made to expand its available fast-access memory size by employment of the following scheme. The disc drive should include a servo system (such as 150) capable of accelerating and decelerating a transducer (such as 118) located on an actuator arm (such as 110), a rapid-access memory unit (such as 304), a slow-access memory unit (such as 306), a read-only memory unit (such as 308), and a microprocessor (such as 302) for executing software instructions stored upon the rapid-access and slow-access memory units. Initially, the disc drive receives a command from a host (such as 140). Then, it determines whether the command requires access to the first software unit (such as shown by transitional arrows 406 and 407, jointly). Finally, it loads the first software unit from the slow-access memory (such as 306) into an address range in the fast access memory (such as 304) occupied by a second software unit used only during a second mode of disc drive operation, upon determining that the command requires access to the first software unit.

The first software unit may be a set of software commands for driving the servo system during the first mode of operation. Further, the first mode of operation may be a diagnostic mode. The second software unit may be a set of software commands for interfacing with the host during the second mode of operation, and the second mode of operation may be a functional mode of disc drive operation.

The disc drive may also be made to load the second software unit from the read-only memory unit (such as 308) into the fast-access memory unit (such as 304) upon powering-up of the disc drive (such as in operation 602). Similarly, the disc drive may be made to load the second software unit from the read-only memory (such as 308) unit into the fast-access memory unit (such as 304) upon rebooting of the microprocessor (such as in operation 602). Once loaded into the fast-access memory (such as 304), the first software unit may remain stored in the fast-access memory unit until the disc drive power is recycled or until the microprocessor is rebooted. Optionally, the fast-access memory unit (such as 304) may further store a third software unit that is always stored in the fast-access memory unit and comprises a set of commands for driving the servo system (such as 150).

A microprocessor (such as 142) in the disc drive may be programmed to implement the above-recited steps.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the scheme may be expanded to operate upon a disc drive employing any number of modes of operations. Additionally, the scheme may be employed in devices other than disc drives. The scheme is susceptible of deployment in any device that utilizes a fast-access and slow-access memory unit, and has certain software modules that are time-critical and certain software modules that are not time-critical. Furthermore, the software modules may contain functionality divided up in any manner. Numerous other changes may be made which will readily suggest themselves to those skilled in the art and which are encompassed in the invention disclosed and as defined in the appended claims.

What is claimed is:

1. In a data storage device including a fast-access memory unit, a slow-access memory unit, a read-only memory unit, and a microprocessor for executing software instructions stored upon the fast-access and slow-access memory units, a method for loading a first software unit used during a first mode of operation from the slow-access memory unit into the fast-access memory unit, the method comprising:
    (a) receiving a command from a host;
    (b) determining whether the command requires access to the first software unit; and
    (c) loading the first software unit from the slow-access memory into an address range in the fast-access memory occupied by a second software unit not used during the first mode of operation, upon an affirmative determination in step (b);
    wherein the data storage device further includes a servo system capable of accelerating and decelerating a transducer located on an actuator arm, and wherein the first software unit comprises a set of software commands for driving the servo system during the first mode of operation.

2. The method of claim 1, wherein the first mode of operation is a diagnostic mode.

3. The method of claim 1, wherein the first software unit remains stored in the fast-access memory unit until the data storage device power is recycled or until the microprocessor is rebooted.

4. The method of claim 1 wherein the fast-access memory unit further stores a third software unit that is always stored in the fast-access memory unit and comprises a set of commands for driving the servo system.

5. In a data storage device including a fast-access memory unit, a slow-access memory unit, a read-only memory unit, and a microprocessor for executing software instructions stored upon the fast-access and slow-access memory units, a method for loading a first software unit used during a first mode of operation from the slow-access memory unit into the fast-access memory unit, the method comprising:
    (a) receiving a command from a host;
    (b) determining whether the command requires access to the first software unit; and
    (c) loading the first software unit from the slow-access memory into an address range in the fast-access memory occupied by a second software unit not used during the first mode of operation, upon an affirmative determination in step (b);
    wherein the second software unit comprises a set of software commands for interfacing with the host during a second mode of operation.

6. The method of claim 5, wherein the second mode of operation is a functional mode of operation.

7. The method of claim 5, further comprising loading the second software unit from the read-only memory unit into the fast-access memory unit upon powering-up of the data storage device.

8. The method of claim 5, further comprising loading the second software unit from the read-only memory unit into the fast-access memory unit upon rebooting of the microprocessor.

9. A data storage device comprising:
    a servo system capable of accelerating and decelerating a transducer located on an actuator arm;
    a fast-access memory unit;
    a slow-access memory unit storing a first software unit used during a first mode of operation;
    a read-only memory unit; and a microprocessor for executing software instructions stored upon the fast-access and slow-access memory units, the microprocessor being programmed to execute the following steps
(a) receive a command from a host;
(b) determine whether the command requires access to the first software unit; and
(c) load the first software unit from the slow-access memory into an address range in the fast-access memory occupied by a second software unit not used during the first mode of operation, upon an affirmative determination in step (b);
wherein the data storage device further comprises a servo system capable of accelerating and decelerating a transducer located on an actuator arm, and wherein the first software unit comprises a set of software commands for driving the servo system during the first mode of operation.

10. The data storage device of claim 9, wherein the first mode of operation is a diagnostic mode.

11. The data storage device of claim 9, wherein the first software unit remains stored in the fast-access memory unit until the data storage device power is recycled or until the microprocessor is rebooted.

12. The data storage device of claim 9, wherein the fast-access memory unit further stores a third software unit that is always stored in the fast-access memory unit and comprises a set of commands for driving the servo system.

13. A data storage device comprising:
a servo system capable of accelerating and decelerating a transducer located on an actuator arm;
a fast-access memory unit;
a slow-access memory unit storing a first software unit used during a first mode of operation;
a read-only memory unit; and
a microprocessor for executing software instructions stored upon the fast-access and slow-access memory units, the microprocessor being programmed to execute the following steps
(a) receive a command from a host;
(b) determine whether the command requires access to the first software unit; and
(c) load the first software unit from the slow-access memory into an address range in the fast-access memory occupied by a second software unit not used during the first mode of operation, upon an affirmative determination in step (b);
wherein the second software unit comprises a set of software commands for interfacing with the host during a second mode of operation.

14. The data storage device of claim 13, wherein the second mode of operation is a functional mode of operation.

15. The data storage device of claim 13, further comprising loading the second software unit from the read-only memory unit into the fast-access memory unit upon powering-up of the data storage device.

16. The data storage device of claim 13, further comprising loading the second software unit from the read-only memory unit into the fast-access memory unit upon rebooting of the microprocessor.

17. A data storage device comprising:
a microprocessor; and
a means for loading, from a slow-access memory unit, a first software unit used during a first mode of operation, to an address range of a fast-access memory unit occupied by a second software unit not used during the first mode of operation, wherein the loading operation occurs upon transition from a second mode of operation to the first mode of operation;
wherein the first software unit comprises a set of commands for driving a servo system during the first mode of operation.

18. The data storage device of claim 17, wherein the first mode of operation is a diagnostic mode.

19. A data storage device comprising:
a microprocessor; and
a means for loading, from a slow-access memory unit, a first software unit used during a first mode of operation, to an address range of a fast-access memory unit occupied by a second software unit not used during the first mode of operation, wherein the loading operation occurs upon transition from a second mode of operation to the first mode of operation;
wherein the second software unit comprises a set of commands for interfacing with a host during the second mode of operation.

20. The data storage device of claim 19, wherein the second mode of operation comprises a functional mode of operation.

21. The data storage device of claim 19, wherein the second software unit is loaded into the fast-access memory unit upon power-up of the data storage device or upon rebooting of the microprocessor.

* * * * *